(No Model.)
J. D. ABBOTT.
SAW HANDLE.
No. 304,396. Patented Sept. 2, 1884.
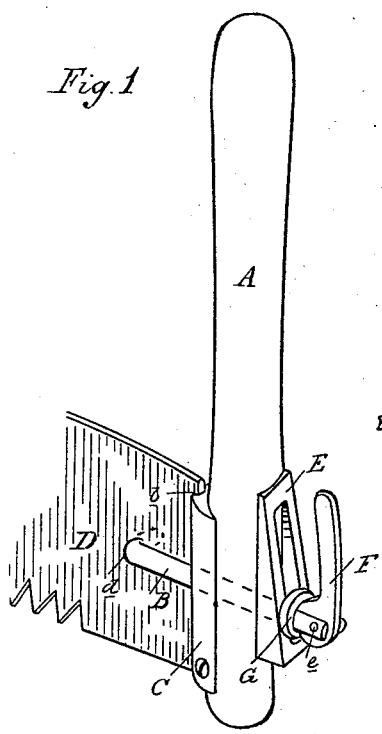
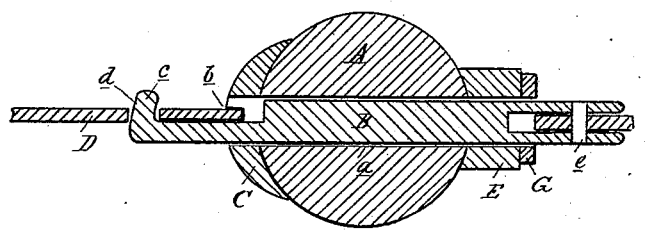
Attest
J. Paul Mayer
Inventor
John D. Abbott
By Thos. S. Sprague
Atty

UNITED STATES PATENT OFFICE.

JOHN D. ABBOTT, OF READING, MICHIGAN, ASSIGNOR OF TWO-THIRDS TO JAY W. CHAPMAN AND ERNEST CANFIELD, OF SAME PLACE.

SAW-HANDLE.

SPECIFICATION forming part of Letters Patent No. 304,396, dated September 2, 1884.

Application filed May 15, 1884. (No model.)

*To all whom it may concern:*

Be it known that I, JOHN D. ABBOTT, of Reading, in the county of Hillsdale and State of Michigan, have invented new and useful Improvements in Saw-Handles; and I hereby declare that the following is a full, clear, and exact description thereof, reference being had to the accompanying drawings, which form a part of this specification.

This invention relates to certain new and useful improvements in the construction of removably-adjustable tangs or handles for crosscut-saws.

The invention consists in the peculiar construction of the parts, and their various combinations, as more fully hereinafter described.

Figure 1 is a perspective of one end of a saw, with my improved tang attached thereto, it being understood that a duplicate of this handle is to be secured to the opposite end of the saw. Fig. 2 is a cross-section on the line of the locking bolt-clamp.

In the accompanying drawings, which form a part of this specification, A represents a handle, through which is bored a lateral hole, $a$, through which the locking-bolt B passes.

C is a plate, its inner surface being such as to conform to and fit the handle, while its outer surface is in the form of a part of an ellipse, as shown in Fig. 2, and through this plate is bored or formed a hole, which, when said plate is in position on the handle, is coincident with the hole in said handle, and a vertical groove, $b$, is cut or formed upon the outer face of said plate of the proper width to receive the end D of the saw.

E is a wedge-shaped plate, concave upon its inner face, as shown in cross-section, to conform to the shape of the handle, and this wedge is longitudinally slotted nearly its entire length. The locking-bolt B passes through this slot and the coincident holes in the handle and plate C, and one end of this bolt terminates in a locking-hook, $c'$, which engages in a hole, $d$, in the saw. The opposite end of this bolt is slotted to receive the cam-lever F, which is pivotally secured thereto by the bolt or rivet $e$, a washer-plate, G, being sleeved upon the bolt and interposed between the cam-lever and the outer face of the wedge.

In practice the end of the saw is engaged with the groove $b$ in the plate C, the cam-lever thrown back, and the wedge loosened, so that the hook $c$ of the bolt will enter the hole $d$ in the saw. Then the wedge is partially tightened, and the cam tightened against the face of the washer-plate, which draws the end of the saw tightly into the groove and holds the parts rigidly in their relation to each other. The reversal of these movements loosens the saws and allows the handles to be removed and used upon another saw, if desired.

I am aware of Patents Nos. 99,825, 278,935, and 280,928, and make no claim to anything shown therein as forming a part of my invention.

What I claim as my invention is—

1. A saw-handle provided with a grooved resistance-plate, to engage with the end of a saw, in combination with a hook-bolt provided with a washer or resistance-plate thereon, and a slotted wedge to embrace the bolt between the handle and the washer-plate, and the cam-lever F, attached to the outer end of the said hook-bolt, to secure the parts together, substantially as specified.

2. A saw-handle, A, provided on one side with a grooved resistance-plate, C, and a slotted wedge, E, and washer-plate G on the other side, and a bolt, B, passing through said handle and its attachments, and having a hooked termination, $c$, at its inner end, in combination with a cam-lever, F, attached to the outer or free end of said bolt B, the parts being arranged, constructed, and operating substantially as and for the purposes set forth.

JOHN D. ABBOTT.

Witnesses:
H. P. PARMELEE,
HOYT P. PARMELEE.